(12) United States Patent
Dunn, Jr. et al.

(10) Patent No.: US 7,299,076 B2
(45) Date of Patent: Nov. 20, 2007

(54) VEHICLE COMMUNICATING

(75) Inventors: Charles E. Dunn, Jr., Boylston, MA (US); Jeffery J. Faneuff, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 11/054,259

(22) Filed: Feb. 9, 2005

(65) Prior Publication Data

US 2006/0178169 A1   Aug. 10, 2006

(51) Int. Cl.
*H04Q 7/20* (2006.01)

(52) U.S. Cl. .................. 455/569.1; 455/569.2

(58) Field of Classification Search ............. 455/41.1, 455/41.2, 569.1, 569.2, 575.9, 557; 701/49, 701/214; 359/844, 872; 342/357.06; 343/711; 381/336, 388, 186, 182, 92, 111–117, 355, 381/356, 358

See application file for complete search history.

(56) References Cited

U.S. PATENT DOCUMENTS

| | | | |
|---|---|---|---|
| 5,898,908 A * | 4/1999 | Griffin et al. ............. 455/127.2 |
| 6,198,693 B1 * | 3/2001 | Marash ....................... 367/125 |
| 6,697,638 B1 | 2/2004 | Larsson et al. |
| 2002/0032048 A1 | 3/2002 | Kitao et al. |
| 2002/0032510 A1 | 3/2002 | Turnbull et al. |
| 2002/0082058 A1 | 6/2002 | Baratono et al. |
| 2002/0142803 A1 | 10/2002 | Yamamoto |
| 2002/0197954 A1 | 12/2002 | Schmitt et al. |
| 2002/0197955 A1 | 12/2002 | Witkowski et al. |
| 2003/0013411 A1 | 1/2003 | Uchiyama |
| 2003/0214447 A1 * | 11/2003 | Sasagawa et al. .......... 343/713 |
| 2004/0176106 A1 * | 9/2004 | Tendler .................... 455/456.5 |
| 2004/0196179 A1 | 10/2004 | Turnbull |
| 2004/0204074 A1 | 10/2004 | Desai |
| 2004/0214525 A1 | 10/2004 | Byung-Koo et al. |
| 2004/0246607 A1 | 12/2004 | Watson et al. |
| 2005/0009574 A1 | 1/2005 | Lin |
| 2006/0023892 A1 * | 2/2006 | Schultz ....................... 381/58 |

FOREIGN PATENT DOCUMENTS

| | | |
|---|---|---|
| EP | 1049347 A1 | 11/2000 |
| EP | 1078818 A2 | 2/2001 |
| EP | 1 156 645 | 11/2001 |
| EP | 1359675 A1 | 11/2003 |
| EP | 1487182 A1 | 12/2004 |
| WO | WO 2004/086735 | 10/2004 |
| WO | WO 2005/029825 A1 | 3/2005 |

OTHER PUBLICATIONS

James A. Martin, Bluetooth Gadgets Branch Out—We look at four wireless phone accessories, PC World, Nov. 2004.

* cited by examiner

*Primary Examiner*—Jean Gelin
(74) *Attorney, Agent, or Firm*—Fish & Richardson P.C.

(57) ABSTRACT

A communication system for a vehicle is described. The communication system includes a microphone array having a plurality of microphones mounted within the vehicle for receiving acoustic signals and converting the acoustic signals to electrical signals. An antenna is mounted proximate to the microphone array. The antenna communicates a radio frequency signal to a wireless device. The communication system also includes a controller having a first input that is electrically coupled to at least one microphone in the microphone array and a second input that is electrically coupled to the antenna. The controller processes the electrical signals and transmits the processed electrical signals to the antenna.

17 Claims, 5 Drawing Sheets

VEHICLE COMMUNICATING

BACKGROUND OF THE INVENTION

Automobiles have included a hands free cellular system with a remote microphone located in the automobile to receive acoustic signals, and an antenna as part of a wireless RF link to connect hardware components with the user's cellular telephone. The automobile sound system reproduces the audio signal received by the cellular telephone.

SUMMARY OF THE INVENTION

The present invention relates to a communication system. The invention relates to methods and apparatus for packaging a microphone array (where the array may consist of a single microphone element or a plurality of microphone elements; a microphone element may also be referred to as a microphone or a microphone capsule) and an antenna mounted permanently in a vehicle in such a manner as to reduce the installation labor and/or materials costs for the microphone and antenna assembly. Microphones operating in a multiple element array each receive acoustic signals. The signals may be processed in such a way as to provide emphasis for acoustic signals originating from a specific location.

One aspect of the invention includes co-locating the microphone and antenna elements in such a fashion as to facilitate combining multiple conductors into a single cable run or vehicle wiring harness branch, for connection with a central controller. Other alternative embodiments include mounting both the antenna and the microphone proximate to one another or in the same enclosure, or modulating electrical signals from multiple microphone elements onto the same conductors, or modulating electrical signals from multiple microphone elements and antenna signals (both transmitted and received) onto the same conductors.

According to one embodiment, the communication system for a vehicle has a microphone array comprising a plurality of microphone elements within the vehicle for receiving an acoustic signal and converting the acoustic signal to an electrical signal. The communication system also includes an antenna, mounted proximate to the microphone. The antenna communicates a radio frequency signal to a wireless device. The communication system also includes a controller with a first input that is electrically coupled to the at least one microphone element and a second input that is electrically coupled to the antenna. The controller processes the electrical signal and transmits the processed electrical signal to the antenna.

In one embodiment, the microphone array and the antenna are permanently mounted in the vehicle.

In another embodiment, the communication system further comprises an enclosure that houses the microphone array and the antenna.

In another embodiment, the controller is located remotely from the microphone array and the antenna.

In one embodiment, the communication system has a first cable that couples the microphone to the controller and a second cable that couples the antenna to the controller.

In one embodiment, the first and the second cable are located proximate to each other for at least a portion of the length of one of the first and the second cables.

In another embodiment, at least a portion of at least one of the first and the second cables is coaxial cable.

In one embodiment, the communication system comprises a single cable that couples the controller to at least one microphone in the microphone array and the antenna.

In one embodiment, the microphone array for receiving an acoustic signal comprises a plurality of microphone elements configured as a microphone array.

In another embodiment, the microphone array comprises a pressure responsive capsule element microphone.

In another embodiment, the microphone array is positioned proximate to a headliner in the vehicle.

In another embodiment, a microphone element of the microphone array is positioned within one quarter of a wavelength away from a reflective plane formed by the headliner.

In yet another embodiment, the antenna communicates with the wireless device using a Bluetooth® communications protocol.

In one embodiment, the antenna is positioned proximate to a headliner in the vehicle at a distance from a grounded metal surface that is within one-fifth of the wavelength of the radio frequency signal.

In one embodiment, the radio frequency signal is a Bluetooth® radio frequency signal.

In one embodiment, the antenna is positioned overhead and forward of a driver in the vehicle.

In one embodiment, antenna is positioned overhead, centered in the vehicle and forward of the driver.

In another embodiment, the antenna is mounted within a map light enclosure.

In still another embodiment, the antenna is positioned in a location that is chosen from the group comprising a rear-view mirror, an instrument panel, a dashboard, a steering wheel, a visor and an airbag cover.

In another embodiment, the communication system further comprises a second antenna positioned in the vehicle.

In one embodiment, the second antenna is positioned in a trunk of the vehicle.

In another embodiment, the microphone array is mounted proximate to the antenna.

In one embodiment, the microphone array and the antenna are mounted in an enclosure.

In one embodiment, the communication system comprises a low-pass filter that is coupled to at least one microphone in the microphone array. The low-pass filter filters out radio frequency interference.

In another embodiment, the communication system further comprises an amplifier that is coupled to at least one microphone element in the microphone array. The amplifier amplifies an audio signal from the at least one microphone element.

In one embodiment, the electrical signal is transmitted as a low voltage differential signal so as to increase immunity to extraneous interference. Each conductor references to a ground circuit.

In another embodiment, the communication system comprises a multiplexer that multiplexes, for transmission over a single cable, at least two of the following: a power signal, the electrical signal and the radio frequency signal.

In another embodiment, the communication system comprising at least one pre-amplifier that is coupled to at least one microphone in the microphone array.

In yet another embodiment, the communication system comprises an analog to digital converter that is coupled to the microphone array.

In another embodiment, a first conductor transmits a non-inverted polarity microphone output signal. A second conductor transmits an inverted polarity microphone output signal. A third conductor provides a reference point relative to signals on the first and second conductors. A differential amplifier converts the signals from the first and second conductors to a single-ended signal.

In another embodiment, an enclosure comprises a microphone array that receives acoustic signals. The microphone array converts the acoustic signals into electrical signals that are transmitted to a controller. An antenna is positioned adjacent to the microphone array. The antenna transmits a radio-frequency signal, related to the electrical signals, from the controller. A housing mounted in a vehicle surrounds at least a portion of the microphone array and at least a portion of the antenna. The housing is configured to allow the microphone array to receive the acoustic signals.

In one embodiment, the microphone array comprises a plurality of microphones. In another embodiment, the plurality of microphones is configured to receive the acoustic signals.

In one embodiment, the housing comprises at least one port. The port allows at least one microphone in the microphone array to receive the acoustic signals.

In one embodiment, the antenna communicates with a wireless device.

In one embodiment, the housing comprises EMI shielding that reduces electromagnetic interference in the enclosure.

In another embodiment, the housing comprises acoustic damping material that reduces acoustic noise in the enclosure.

In one embodiment, a communication system for a vehicle comprises a microphone array mounted within the vehicle. The microphone array receives acoustic signals and converts them to electrical signals. The communication system also comprises a first cable that couples the at least one microphone in the microphone array to a controller. The first cable transmits the electrical signals to the controller. The communication system also comprises an antenna and a second cable that couples the antenna to the controller. The antenna, located proximate to the microphone array receives a radio frequency signal transmitted from the controller to a wireless device. The antenna receives radio frequency signals from a wireless device. The second cable transmits the radio frequency signals from the antenna to the controller and transmits signals that are related to the electrical signals from the controller to the antenna.

In another embodiment, at least one microphone in the microphone array comprises a pressure responsive microphone element.

In another embodiment, the microphone array is positioned proximate to a headliner in the vehicle.

In yet another embodiment, a microphone element in the microphone array is positioned within one-quarter of a wavelength away from a reflective plane formed by headliner in the vehicle.

In another embodiment the antenna communicates with the wireless device using a Bluetooth® communications protocol.

In another embodiment, the antenna is positioned proximate to a headliner in the vehicle at a distance from a grounded metal surface that is within one-fifth of the wavelength of the radio frequency signal at the highest frequency contained in the radio frequency.

In one embodiment, the antenna is positioned in a location that is chosen from the group comprising a rear-view mirror, an instrument panel, a dashboard, a steering wheel, a visor and an airbag cover.

In one embodiment, the microphone array and the antenna are mounted in an enclosure.

In one embodiment, a low-pass filter is coupled to at least one microphone in the microphone array. The low-pass filter filters out radio frequency interference.

In one embodiment, the communication system comprises an amplifier that is coupled to at least one microphone in the microphone array. The amplifier amplifies an electric signal from the at least one microphone.

In another embodiment, at least a portion of at least one of the first and the second cables comprises coaxial cable.

In one embodiment, the electrical signals are transmitted as low voltage differential signals to increase immunity to extraneous interference.

In one embodiment, the audio device further comprises a multiplexer that multiplexes signals from the microphone array.

In another embodiment, the communication system comprises at least one pre-amplifier that is coupled to at least one microphone in the microphone array.

In another embodiment, the communication system comprises an analog to digital converter that is coupled to the microphone array.

In another embodiment, the microphone comprises a pressure responsive capsule element microphone.

In yet another embodiment, the microphone array is positioned proximate to a headliner in the vehicle.

In still another embodiment, the microphone capsule of at least one microphone in the microphone array is positioned within one-quarter of a wavelength away from a reflective plane positioned proximate to a headliner in the vehicle.

In yet another embodiment, the antenna communicates with the wireless device using a Bluetooth® communications protocol.

In another embodiment, the antenna is positioned proximate to a headliner in the vehicle at a distance from a grounded metal surface that is within one-fifth of the wavelength of the radio frequency signal.

In yet another embodiment, the antenna is positioned in a location that is chosen from the group comprising a rear-view mirror, an instrument panel, a dashboard, a steering wheel, a visor, and an airbag cover.

In another embodiment, the microphone array and the antenna are mounted in an enclosure.

In another embodiment, the communication system further comprises a low-pass filter that is coupled to the microphone array, the low-pass filter filtering out radio frequency interference.

In another embodiment, the communication system further comprises an amplifier that is coupled to the microphone, the amplifier amplifying the microphone audio signal.

In another embodiment, an electrical signal is transmitted as a two conductor differential signal. Each conductor is referenced to a ground circuit so as to increase immunity to extraneous interference.

In another embodiment, at least a portion of the cable comprises coaxial cable.

In another embodiment, the communication system comprises a multiplexer that is coupled to the cable. The multiplexer multiplexes at least two of the following for transmission over the cable: a power signal, the electrical signal and the radio frequency signal. The communication system also comprises a de-multiplexer that is coupled to the cable. The de-multiplexer de-multiplexes the at least two of the modulated power signal, the electrical signal and the radio frequency signal transmitted over the cable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a hands free cellular telephone system in a vehicle, a user's personal cellular telephone is detected and used as part of the hands free system. Acoustic output from the user is captured by a microphone or microphone elements incorporated in the vehicle (other than in the user's cell phone). This eliminates the need for the user to hold his cell phone up next to his mouth (thus hands free). Acoustic signals from the far end of the telephone system (the person on the other end of the phone connection) are played to the user through the vehicle's audio system. The modulation and demodulation of signals transmitted and received over the cellular network is accomplished by the user's cell phone, so that components providing this capability do not need to be duplicated in the vehicle. In order to accomplish this, a bi-directional communication link between the vehicle components and the cell phone must be established.

Figure 1:
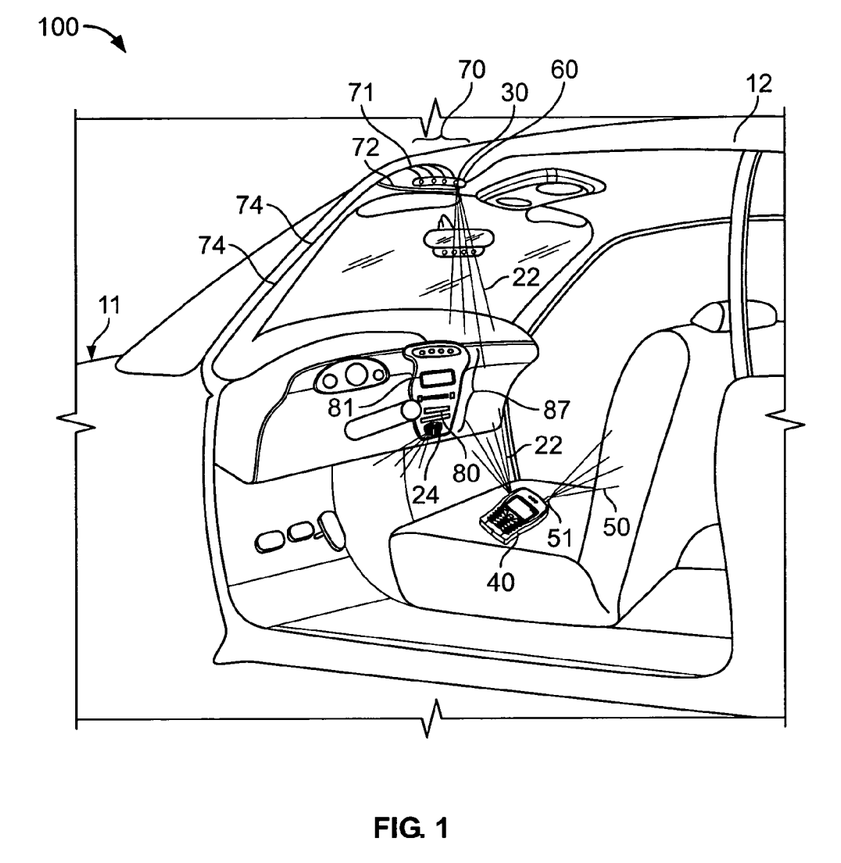
FIG. 1 shows a communication system having a combination antenna and microphone array mounted in an enclosure according to one embodiment of the invention.

FIG. 1 shows a communication system 100 employing a combination of an antenna 30 and a microphone array 70 colocated and mounted in an enclosure 60 remote from controller 80, the enclosure 60 being permanently mounted in a vehicle 11. Microphone array 70 can include any number of microphone elements. The antenna 30, microphone array 70 and enclosure 60 can be installed in various locations in the vehicle 11. The enclosure 60 contains the antenna 30, which is configured to transmit and receive a radio frequency (RF) signal 22. The RF signal 22 is typically modulated with digital information, according to a predetermined protocol such as Bluetooth®, 802.11, UWB or other protocols. In the following discussions, we refer to signals transmitted from a device to antenna 30, or signals transmitted by antenna 30 to a device as RF signals 22.

Microphone array 70 is coupled to controller 80. One method for coupling is via cable 71. The number of conductors incorporated in the cable 71 depends on the number of microphone elements included in microphone array 70, and the method of communicating electrical signals from microphone elements to controller 80. For example, single-ended communication requires the use of two conductors, one for signal and one for a reference, and balanced communication requires use of three conductors, one for a non-inverted polarity signal, one for an inverted polarity signal, and one for a reference. Each microphone element may use its own reference connection, or a single reference connection can be used for multiple microphone elements. Alternatively, electrical output signals from a plurality of microphone elements can be multiplexed onto the same set of conductors. Multiplexing multiple electrical signals will be described in more detail below.

Antenna 30 is coupled to controller 80 via cable 72. Signals received by antenna 30 from cell phone 40 are communicated to controller 80. Controller 80 demodulates the signals received from antenna 30 in a predetermined manner, such as according to the Bluetooth® protocol. Controller 80 also provides modulated RF signals to antenna 30 for transmission to cell phone 40. These signals are modulated in a predetermined manner, such as according to the Bluetooth® protocol. Thus, controller 80 and cell phone 40 communicate over a bi-directional wireless link. Note that cell phone 40 incorporates an antenna (not shown) for receiving wireless information from controller 80. This antenna may be different from the cell phone antenna 51 used to communicate with the cellular network. Circuitry in cell phone 40 (not shown) is configured to receive RF signals, where the RF signals are modulated according to a predetermined protocol, such as the Bluetooth® protocol.

The controller 80 has an output 24 that outputs audio information into the vehicle cabin (typically through the vehicle entertainment system, but may also be through separate audio rendering devices). These signals typically originated from a remote telephone, which communication system 100 is coupled to through cellular telephone 40 and the cellular telephone network. The system 100 includes a cellular telephone 40 (i.e. in the vehicle 11) that transmits a cellular telephone protocol signal 50 over the cellular network.

Microphone array 70 and antenna 30 are mounted within the enclosure 60. Alternatively, microphone array 70 and antenna 30 may be mounted in separate enclosures (not shown), where the separate enclosures are located proximate to each other. The enclosure 60 is mounted to a headliner 12 of the vehicle 11 for effective reception of an acoustic signal.

According to an alternative embodiment, signal processing capability may be located in the microphone array housing 60. For example, an analog-to-digital (A/D) converter (not shown) and/or a microprocessor (not shown), in addition to the microphone array 70 and antenna 30, may be located in the enclosure 60. The A/D converter performs an A/D conversion on the electrical signal output from the microphone (or a microphone pre amplifier). The microprocessor performs digital signal processing of the digital signal output from the A/D converter. The microprocessor may be a general purpose microprocessor, a micro controller, a digital signal processor (DSP), or other device capable of performing computations associated with digital signal processing operations. A useful operation to perform is beamforming, where the multiple signals received from multiple elements in the microphone array are processed to enhance detection of signals arriving at the array location from a particular direction. The output of the beamforming operation (which may be fixed or adaptive) is a single output signal which has been processed to preferentially pickup sound from the location of the acoustic source. The single signal is then sent down over the cable (e.g., a harness 74), instead of sending multiple microphone signals. This reduces cost and complexity of the wiring harness.

A branch of the vehicle wiring harness 74 may incorporate both the cable 71, which connects microphone array 70 to controller 80, and cable 72 which connects antenna 30 to controller 80. The wiring harness branch 74 may include other cables along a portion of its length, besides the microphone array cable 71 and antenna cable 72. The number of conductors contained in wiring harness 74 for communicating between microphone array 70, antenna 30, and controller 80 depends on methods of communication used, as described earlier, and which will be described in more detail below.

Figure 2:
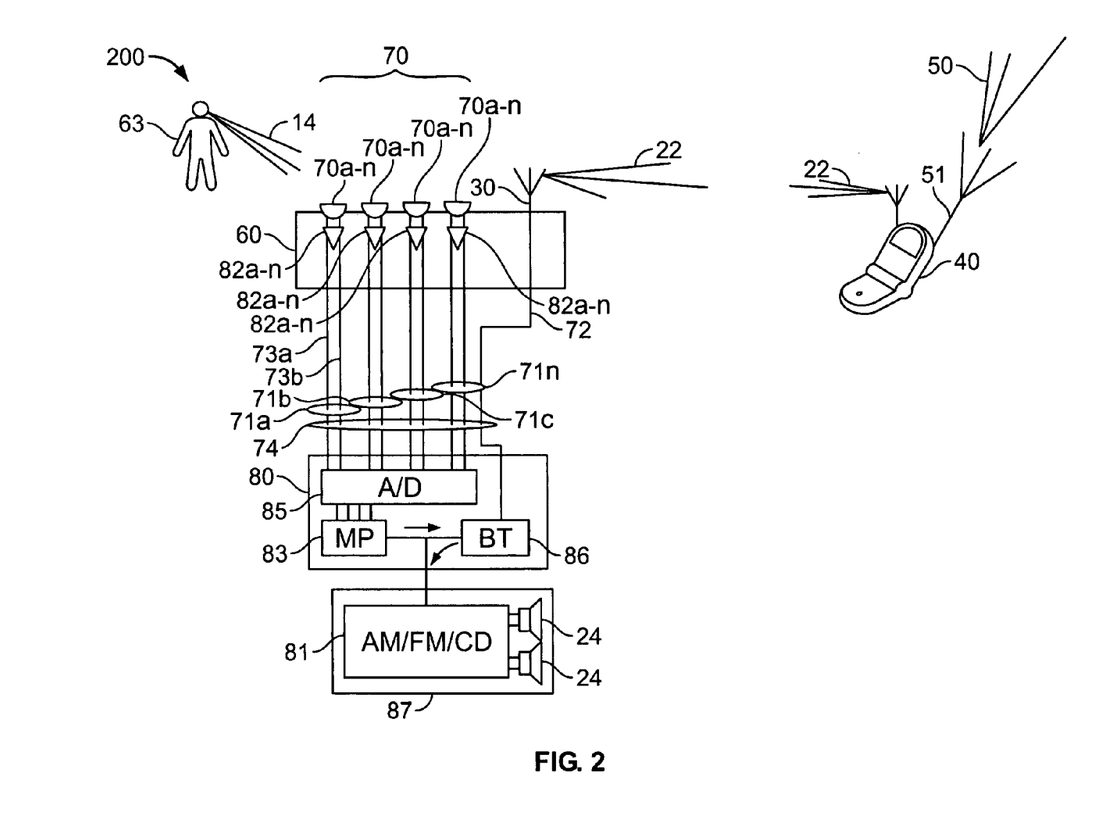
FIG. 2 is a block diagram of a communication system that has separately-wired microphones according to one embodiment of the invention.

For example, a microphone array 70 receives an acoustic signal such as a conversation, voice command or voice message, etc. generated by a vehicle driver or other acoustic source in the vehicle 11. The microphone array 70 converts the acoustic signal into one or more electrical signals (depending on the number of microphone elements included in microphone array 70). The electrical signals are communicated via the cable 71 to the controller 80. The signals can also be carried by the harness 74 to the controller 80. Depending upon the configuration, the controller 80 as shown in FIG. 2 may include an analog to digital (A/D) converter 85, a microprocessor 83, and/or a Bluetooth® conversion module 86. According to other embodiments of the invention, these components may be located in the enclosure 60.

The analog to digital (A/D) converter 85 (FIG. 2) converts the electrical signals output from microphone elements 70a-n (or from microphone pre-amplifiers 82a-n) into digital signals. Then the microprocessor 83 processes the digital signals, and outputs the processed signal to Bluetooth® module 86. Bluetooth® module 86 modulates an RF signal with the digital representation of the acoustic signal picked up by the microphone array 70 (which was processed by A/D converter 85 and microprocessor 83). In turn, modulated RF is communicated to the antenna 30 via cable 72.

The antenna 30 broadcasts the modulated RF signal 22. In turn, the cellular telephone 40 receives the modulated RF signal. The cellular telephone 40 re-modulates the digital representation of the original acoustic signal into a form compatible with the cellular telephone protocol signal 50, and communicates the re-modulated signal over the cellular network. A remote telephone (not shown) receives the cellular telephone protocol signal 50, demodulates it and processes it as necessary to form an acoustic signal that can be heard by a person at the far end of the telephone connection.

The communication system 100 is also configured to transmit acoustic signals that originate at the location of the remote telephone to the vehicle cabin. Accordingly, the cellular telephone 40 receives a cellular telephone protocol signal 50 initiated by a remote telephone (not shown). For example, the cellular telephone 40 may receive signals representing a telephone audio transmission initiated by a person at the far end of a telephone connection. The cellular telephone 40 re-modulates the signal received from the remote telephone into a Bluetooth® compatible RF signal 22, which is then transmitted from cellular telephone 40 to the antenna 30. The signal received by the antenna 30 is communicated to the controller 80 via the cable 72.

Referring again to FIG. 2, within the controller 80, the Bluetooth® module 86 converts the received Bluetooth® compatible RF signal 22 (i.e., representing an audio signal initiated at the far end of a cellular telephone conversation) to an electrical signal (of either analog or digital form, depending on whether digital-to-analog (D/A) converters are incorporated as part of the Bluetooth® module or in a subsequent component located elsewhere in the signal chain) representing the remote telephone acoustic signal. The electrical signal is sent by the controller 80 to an audio reproduction system 87 (incorporating a vehicle audio system "head unit" 81, and loudspeakers 24 located within the vehicle cabin), which renders the electrical signal into an acoustical signal audible to passengers in the vehicle.

Various methods of wireless transmission between the cellular telephone 40 and antenna 30 mounted in the enclosure 60 are possible. One such method is based on the Bluetooth® protocol which provides a method of conducting compatible communications between devices from a variety of manufacturers. The Bluetooth® protocol is a low power (one milliwatt), packet-oriented transmission protocol that has a range of transmission of about thirty feet. Bluetooth® employs spread-spectrum frequency hopping 1,600 times every second, between seventy-nine different channels contained within in the frequency range between approximately 2.4 and 2.5 GHz, which reduces the likelihood of interference with other electronic devices that are located proximate to the cellular telephone 40. The Bluetooth® protocol also provides an effective mechanism for communicating with digital devices such as personal digital assistants (PDAs), telephones, etc. Other protocols for communicating information wirelessly between devices may also be employed. For example, any of the various versions of the IEEE 802.11 family of standards may be employed, as well as any other known method.

When operating in a hands free mode, the speaker and the microphone contained in the cellular telephone 40 are disabled. The cellular telephone 40 uses the received Bluetooth® compatible RF signal 22 (modulated by digital data representative of acoustical signals present within the vehicle cabin) as the input source to the cellular telephone 40. The cellular telephone 40 then converts the modulated Bluetooth® compatible RF signal 22 into a cellular telephone network signal 50 for transmission over the cellular telephone network. Similarly, cell phone 40 outputs a Bluetooth® compatible RF signal (modulated by data received from the cellular telephone network representative of the acoustical signal input to the far end telephone), rather than outputting an electrical signal for reproduction by the internal speaker of the cellular telephone 40. The cellular telephone 40 that is located in the vehicle 11 operates "hands free".

Certain locations within the vehicle 11 are good microphone locations for reception of the acoustic signal. Certain of the same locations are also good antenna locations for transmission and reception of the Bluetooth® compatible RF signal signals 22. In such cases, positioning the microphone array 70 and antenna 30 together provides for good reception of both the acoustic signals and RF signals 22. Examples of such locations include overhead and in front of the driver, on the dashboard in front of the driver, etc. Several favorable locations for the combined microphone and the antenna enclosure 60 are detailed herein.

In one example location, microphone array 70 and antenna 30 are mounted in the same enclosure 60 on the headliner 12 in front of the driver. Alternatively, the microphone array 70 and antenna 30 are mounted, not in the same enclosure 60, but proximate to one another. Such placement provides opportunities for reduction in material and labor costs associated with manufacture of the assembly as well as material and labor costs for installation of the assembly in the vehicle 11. Such co-location of the microphone array 70 and antenna 30 reduces the number of places in the vehicle 11 to which cable needs to be run. Further cost reduction may be possible if multiple signals are modulated onto a single conductor or a smaller number of conductors.

FIG. 2 is a block diagram of a communication system 200 that has separately-wired microphone elements 70*a-n* (i.e., in the microphone array 70) for receiving acoustic signals 14 from a user 63. The outputs of each of the individual microphone elements 70*a-n* are amplified by pre-amplifiers 82*a-n*. Pre-amplification of the individual microphone outputs results in a better signal-to-noise ratio of signals transmitted over the cable 71 between the microphone array 70 and the controller 80, thereby reducing the potential impact of extraneous noise on the system 200. In this example, each individual microphone element 70*a-n* is connected to a respective cable 71*a-n* that has two conductors 73*a*, 73*b*.

A harness 74 may contain cables 71*a-n* carrying signals from each of the individual microphone elements 70*a-n* of the microphone array 70. Such cables may be a plurality of twisted-pair conductors 73*a*, 73*b*, etc. surrounded by a conductive shielding, for example. The cable 72 between the controller 80 and the Bluetooth® antenna 30 may be strung so as to be part of harness 74, or may be strung separately from the harness 74. Coaxial cable may be used as the cable 72 between the controller 80 and the Bluetooth® antenna 30.

Each of the individual cables 71*a-n* connects to an A/D converter 85 within the controller 80. The A/D converter 85 converts electrical signals from microphone array 70 (or outputs from preamplifiers 82*a-n*) into digital signals. Note that a single A/D converter can be used, where the converter is multiplexed across the different pre-amplifier outputs, or individual A/D converters can be used for each pre-amplifier output. The A/D converted supplies digital signals to microprocessor 83. In turn, microprocessor 83 processes the digital signals. The processing applied may take many forms. In one example, digital signal processing to locate the position of an acoustic source within the vehicle may first be applied. The output of this processing is then used as input to a beamforming algorithm (which may be fixed or adaptive), to improve the ability of the beamformed array to preferentially pick up sounds originating from the location of the acoustic source. Alternatively, beamforming algorithms may be used that automatically identify the location of sound sources and steer the array to preferentially detect sound output from those sources, or specific predetermined locations can be identified in advance (such as driver and passenger seats), and beamforming algorithms are applied that preferentially detect sounds arriving from these predetermined locations.

The digital output from microprocessor 83 is supplied to Bluetooth® processor 86, which converts the output into a signal formatted according to the Bluetooth® protocol. In turn, Bluetooth® processor 86 outputs the Bluetooth® compatible signal via cable 72 to antenna 30. As described earlier, antenna 30 is positioned either within the enclosure 60 or proximate to the enclosure 60. Antenna 30 then communicates signals to cell phone 40, which cell phone 40 receives and re-modulates into a form for transmission over the cellular network.

As mentioned earlier, the RF link between antenna 30 and cell phone 40 is bi-directional. Antenna 30 may receive signals from cell phone 40, as well as transmit signals to cell phone 40. The cable 72, connecting the Bluetooth® processor 86 and antenna 30 may also transmit signals bi-directionally. An acoustic signal present in the location of a phone at the far end of a telephone connection (the phone may be cellular or land based) is picked up by the far end telephone, and modulated onto the cellular phone network (either directly by the remote cell phone, or in a telephone switching facility). Cellular phone 40 receives this signal from the cellular network, and re-modulates it into a compatible form (an RF signal employing a protocol such as Bluetooth®) for communication to antenna 30. Antenna 30 receives the RF signal, and communicates it to Bluetooth® converter 86 in controller 80. Bluetooth® converter 86 then demodulates the received signal (i.e. the signal that originated in the remote telephone). The electric signal is sent by the controller 80 to the audio reproduction system 87 (incorporating vehicle audio system "head unit" 81, and loudspeakers 24 located within the vehicle cabin) which renders the electric signal into an acoustical signal audible to the user 63. Alternatively, the controller 80 can be integrated with a separate audio reproduction system. In one example, the vehicle audio system or portions thereof may be used for both entertainment output and output of the remote telephone signal.

Figure 3:
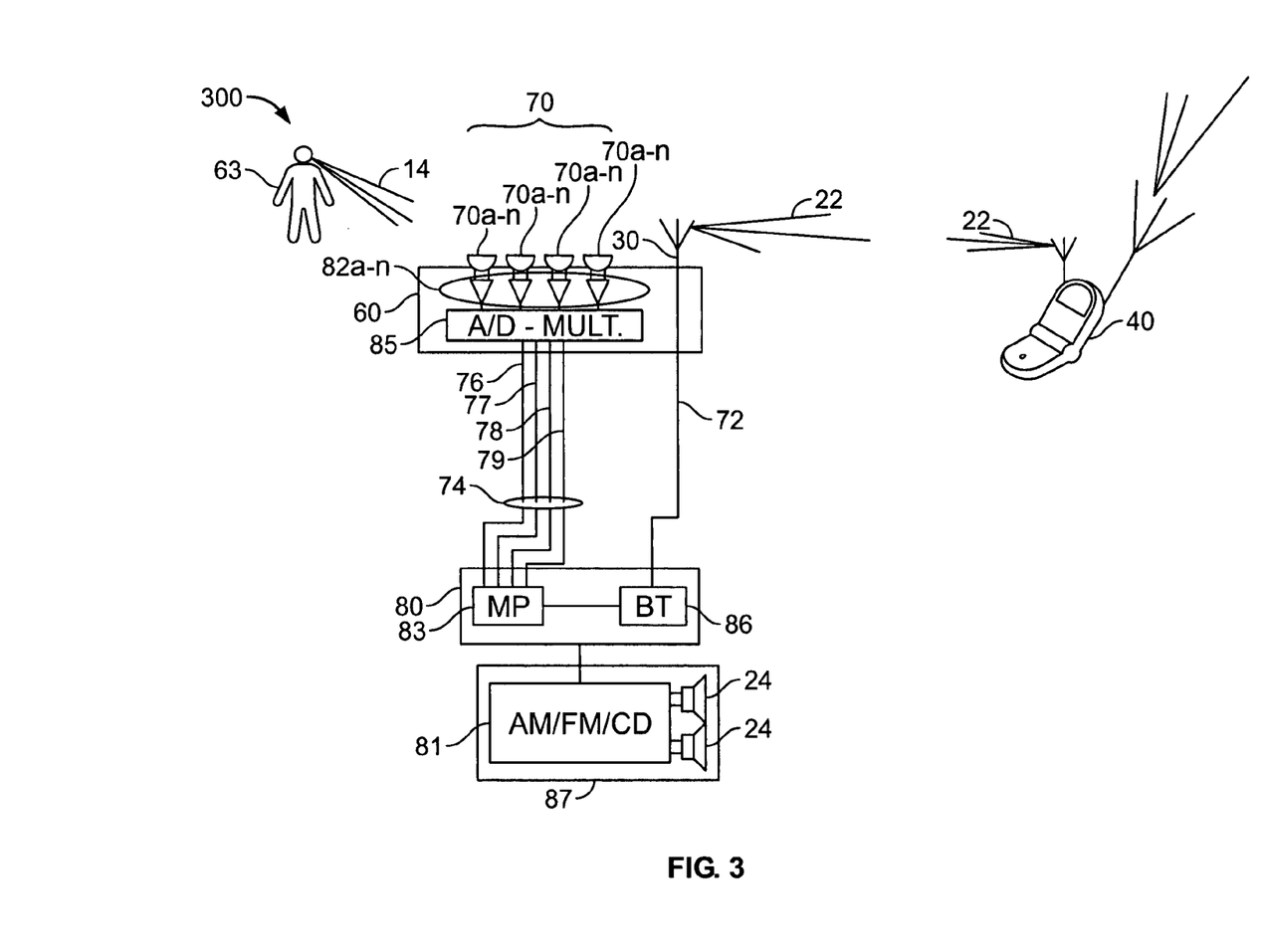
FIG. 3 is a block diagram of a communication system in which the signals transmitted between a microphone array and controller are multiplexed according to one embodiment of the invention.

FIG. 3 is a block diagram of a communication system 300 in which the signals transmitted between microphone array 70 and controller 80 are multiplexed. The enclosure 60 contains the microphone array 70 (e.g., four microphone elements) for receiving acoustic signals 14 from a user 63. Each of the microphones of the microphone array 70 connects to a preamplifier 82*a-n*. The preamplifiers 82*a-n*, in turn, connect to an analog-to-digital (A/D) converter 85, such as the Cirrus Logic 5180 A/D converter/multiplexer.

The A/D converter/multiplexer 85 converts electric signals from the microphones 70*a-n* into digital signals. The multiplexer section of the A/D converter/multiplexer 85 also combines the resulting digital signals into a time division multiplexed (TDM) signal. These two steps of converting the audio signals into digital signals and combining the multiple digital signals into one multiplexed signal may alternatively be performed by separate components each equipped to perform one of the steps, or one component capable of performing both steps.

In one example, the A/D converter output is composed of four separate communication lines including frame sync 76, bit rate 77, data 78 and ground 79 lines. Together, the four lines successively communicate a multiplexed data stream formed from the output of each of the microphone elements 70*a-n* of the microphone array 70. The four lines 76, 77, 78, 79 are located together in the harness 74. According to an alternative configuration, the frame sync 76, bit rate 77, data 78 lines transmit signals to the controller 80 in the form of low voltage differential signals (LVDS).

Low voltage differential signaling (LVDS) is a low noise, low power, low amplitude method for high-speed (gigabits per second) data transmission over copper wire defined in the TIA/EIA-644 and the IEEE 1596.3 standards. To implement LVDS signaling, an LVDS driver converts a TTL/CMOS signal into a low-voltage differential signal composed of two equal and opposite traces referenced to ground. Since each signal is exactly equal and opposite, any returns (i.e., such as induced noise) in a differential circuit simply cancel (with no part of them appearing on the zero-voltage or ground circuit).

The (LVDS) signals are each carried over twisted-pair cable (i.e., two conductors for each signal). The LVDS signals radiate less electromagnetic interference (EMI) thereby causing less interference with other systems.

The digital data representing signals from each microphone (or microphone pre-amplifier) is transmitted via the data signal line 78 in the form of successive frames. In one example, data in one frame is associated with the signal from one microphone. Successive frames contain data from different microphone elements 70*a-n* (i.e., first microphone 70a, then second microphone 70b, then third microphone 70c, etc.). The amount of data chosen to be contained in single frame (i.e., the frame size) is not critical, but should be chosen to minimize latency in transmission. The frame sync signals transmitted via frame sync line 76 are used to identify the frame transitions for data signals transmitted via data line 78 from the different microphones. The 2.4 GHz signal between the controller 80 and the antenna 30 is carried separately over a coax cable 72.

Microprocessor 83 may perform various digital signal processing algorithms on the received signals. For example, noise reduction, echo canceling (echo canceling prevents feedback from the signal output into the car from being re-fed into the microphone), beamforming, speech recognition processing of the received signals, or other signal processing, may be performed. The processed signals are then output by microprocessor 83 to Bluetooth® processor 86, for processing the signals into a Bluetooth® signal. An example device useful as a Bluetooth® processor is the RF Micro Devices® SiW3500®. In turn, the Bluetooth® signal is transmitted via antenna 30 to the cellular telephone 40, for signal transmission via the cellular network (e.g., GSM, CDMA, etc. network).

As previously described, there is a bi-directional communication link between the cellular network (i.e. connected via the cellular telephone 40) and the controller 80. Accordingly, cell phone 40 may receive communications over the cellular network. For example, cell towers maintained by the telephone company relay cellular signals at 900 MHz or 1.6, 1.8 GHz. (i.e. GSM, CDMA, etc.), which are received by the cellular telephone 40. In turn, the cellular telephone 40 transforms the received cellular signal into a Bluetooth® signal for transmission to the antenna 30. The Bluetooth® signal is transmitted over the cable 72 that couples the Bluetooth® antenna 30 to the controller 80. The controller is coupled to the audio reproduction system 87 from which output is sent to the transducers 24 in the vehicle.

Although FIG. 3 describes a method for multiplexing multiple signals onto four conductors using a digital time division multiplexing scheme (TDM), many other known methods to multiplex multiple signals onto a small number of signal paths may be employed. For example, serial data communication systems employing only two conductors are known and could be employed in place of the four conductor scheme described in FIG. 3. Also, it should be noted that the system of FIG. 3 could multiplex many more than four microphone signals onto the same four conductor digital transmission path (or a two conductor serial transmission path). Other schemes using packet based transmission may also be employed. Additionally, analog multiplexing methods known in the art, such as frequency division multiplexing could be employed.

One embodiment of the invention uses modulation techniques to modulate analog signals from multiple elements 70a-n in a microphone array 70 onto a single cable. For example, multiple electrical signals output from the microphones can be modulated onto the same cable by using frequency division multiplexing. FM modulation is well known, and will not be described in detail here. Simply, carrier frequencies are selected for each microphone signal to be modulated. The carriers are spaced apart sufficiently in frequency such that the modulated carriers do not interfere with each other. A bandwidth of 200 kHz for each modulated signal can be used, for example.

For a system having four microphone signals to be modulated, a first signal can be used at baseband (i.e., without modulation), and each of the three of other microphone signals can be modulated on carriers of 200 kHz, 400 kHz, and 600 kHz, respectively. Three modulators (not shown) that perform the modulation are located near microphone array 70. Each of the microphone signals (except the microphone signal sent at baseband) is modulated onto its respective carrier. The outputs of the modulators are summed together, and the combined signal is sent over a single conductor pair (for single ended transmission, three conductors are necessary for balanced transmission). At the reception end (controller 80), a low-pass filter can extract the baseband signal. Three demodulators (not shown) are required to extract the three modulated signals. The outputs of the demodulators correspond to the original analog electrical signal outputs of the three microphone elements 70a-n.

It is also possible to use cable 71 to communicate RF signals to and from antenna 30. In an embodiment where analog audio signals are transmitted over cable 71, the audio signals contain energy in the low audio frequency range, well separated from the frequency range of RF signals 22. Audio signals are generally between 20 Hz-20 kHz, and RF signals (e.g., for Bluetooth®) are in the range of 2.4-2.5 GHz. Simple filtering can be applied at either end of cable 71 to separate out signals of interest for communication with a device of interest.

In addition to carrying the electrical signals from the microphone array 70, the harness 74 may also be coupled to a power source for transmission of DC power (e.g., such as power designated to power a map light, or to power circuitry contained within the enclosure 60, such as pre-amplifiers, A/D converters, etc.). Accordingly, in addition to transmitting the electrical signals from the microphone array 70, and/or digital signals, the harness 74 can also conduct DC power.

Figure 4:
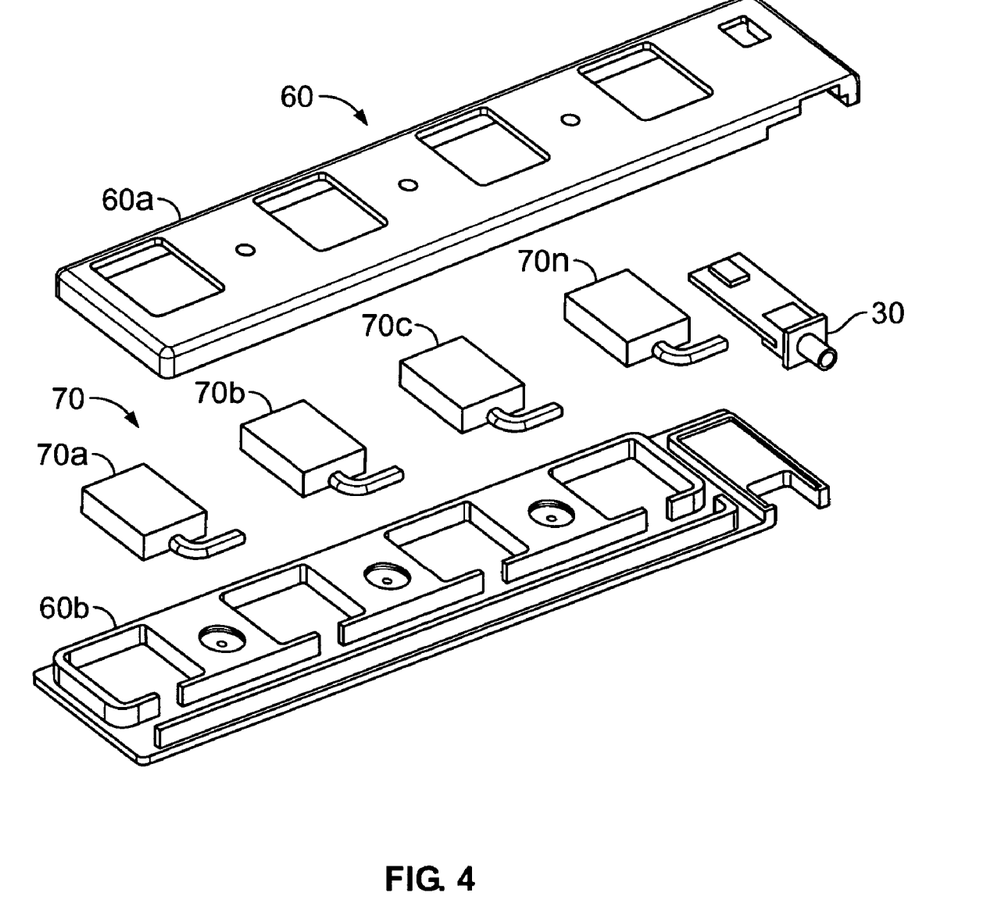
FIG. 4 illustrates an exploded view of an enclosure including a microphone array and antenna according to one embodiment of the invention.

FIG. 4 illustrates an exploded view of an enclosure 60 including microphone array 70 having a plurality of microphones 70a-n and an antenna 30. The enclosure 60 comprises a top section 60a and a bottom section 60b according to one embodiment of the invention. The enclosure 60 is configured to contain the plurality of microphones 70a-n of the microphone array 70 (four microphone elements 70a-n are depicted, by way of example only) and one or more antennas 30. The enclosure surrounds at least a portion of the microphone array 70. Within the enclosure 60, the individual microphone elements 70a-n and the antenna 30 may be oriented in any direction. Additionally, the enclosure 60 can be constructed with one or more ports to allow at least one of the microphone elements 70a-n in the microphone array 70 to receive acoustic signals. The enclosure 60 can also include acoustic damping material that can reduce acoustic noise in the enclosure 60. The enclosure 60 can also include EMI shielding that can reduce electromagnetic interference in the enclosure 60. The enclosure 60 may be constructed in any of a variety of shapes and materials and positioned in various locations within the vehicle.

Figure 5:
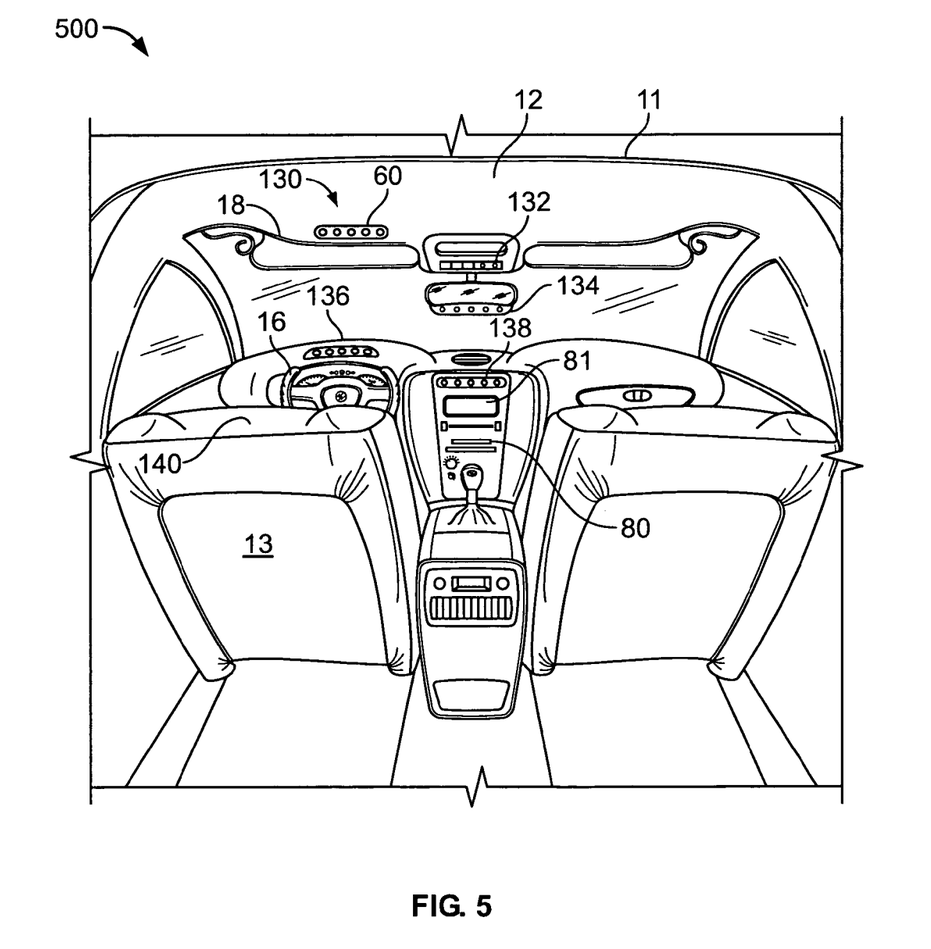
FIG. 5 illustrates an interior of a vehicle depicting various locations for the combination antenna and microphone assembly according to one embodiment of the invention.

FIG. 5 illustrates an interior 500 of a vehicle 11 in which various alternative locations for the enclosure 60 are depicted. The first position 130, as described earlier with respect to FIG. 1, shows the enclosure 60 mounted in the headliner 12 of the vehicle 11, in front of the driver's seat 13. The enclosure 60 is positioned to provide acceptable reception and transmission of Bluetooth® compatible RF signals, considering the likely locations for the cellular telephone 40 (FIG. 1) within the vehicle 11.

The first position 130 also provides good reception of an acoustic signal 14 (See FIG. 2) such as the driver's voice. The first position 130 minimizes noise and interference from undesired acoustic signals such as wind noise emanating from an open window or noise emanating from an air conditioner. The first position 130 is close to the acoustic signal 14 and is further away from noise sources, such as the engine, the road, and the wind. This increases the signal-to-noise (S/N) ratio and improves audio quality of the acoustic signal 14. In addition, the first position 130 minimizes electrical interference to the microphone array 70 and/or antenna 30 signals emanating from sources such as the controller 80, a video screen, or from other electronic devices mounted elsewhere in the vehicle 11.

The microphone array may use any type of microphone element, or combination of microphone element types. Typical types are pressure responding and pressure gradient responding (also know as differential, bi-directional, dipole, or figure of eight microphones). However, certain types of elements are more susceptible to generation of wind noise in use. In a vehicle, wind may interact with a microphone when a window is rolled down, or the vehicle environmental controls are used (heat, air conditioning, fan, etc.). Pressure responding type microphone elements are inherently less susceptible to generation of wind noise than pressure gradient type microphones, and may be used in embodiments where the microphone elements are exposed to large air flows. Additional techniques may also be employed to reduce sensitivity to wind noise, such as the application of open cell foam or wire mesh screens to reduce air turbulence in the vicinity of microphone elements.

One technique for reducing interference with the microphone element output signals is to amplify the microphone element electrical signal outputs at a position near to the microphone elements. The signals are amplified before any external interference during transmission occurs. The amplified signals are then transmitted over cable 71 to controller 80 thereby improving the signal-to-noise ratio of the signal received at controller 80 from the microphone array 70.

Another technique for minimizing undesirable interference is to employ balanced signal transmission between the microphone array 70 and controller 80. As previously described, according to such an arrangement, the output of each microphone element is converted from single ended to a differential form, for transmission to the controller 80. This involves transmitting a non-inverted and inverted replica of the microphone output signal, as well as providing a reference connection. A differential amplifier is used at controller 80 to convert the balanced signal back to single ended. Interference induced onto the cable will be approximately equal on each conductor and is rejected by the differential amplifier. Note that this method could also be employed for transmission of a multiplexed microphone signal (e.g., FM modulated), or any audio signal transmitted from the microphone location to a remote location.

Locating microphone elements close to a large reflecting plane can enhance the performance of the microphone array 70. Headliner 12 serves as a reflective plane near the microphone array 70. Locating microphone array 70 close to a reflection plane narrows the directivity of microphone elements (for example, for omni-directional microphone elements, the directivity pattern is changed from spherical to hemispherical), and some acoustic gain is achieved by placement of microphone elements within the "pressure zone" of the reflective surface. To benefit from this acoustic gain, the microphone elements should be located closer to the reflecting plane than a quarter-wavelength, at the highest frequency of interest.

The directivity of antenna 30, for both reception and transmission of RF signals, can also be altered by its location. For example, placement of antenna 30 close to a grounded metal surface (such as the roof of the vehicle 11 located above and close to the headliner 12) increases the directivity of transmission/reception to/from an antenna 30. Preferably, the antenna 30 is mounted a distance from the grounded metal surface that is a small fraction of the wavelength (e.g., less than 1/10) of the highest frequency of interest. For Bluetooth® transmission, this distance is approximately 1.2 cm. However, the directivity of the antenna 30 can still be improved by mounting the antenna 30 up to approximately 2.5 cm from the ground plane. According to an alternative embodiment, the communication system is configured to have a second antenna positioned in the vehicle in a location such as the trunk of the vehicle thereby improving reception of radio frequency signals.

Alternative locations for the enclosure 60 include an overhead position 132 in the center of the vehicle 11 and forward of the driver's seat 13, within a map-light enclosure or other position on the headliner 12, in a rear-view mirror 134, in an instrument panel 138, on top of the dashboard 136 in front of the driver's seat 13, on a steering wheel 16, visor 18, on an airbag cover 140, or on the controller 80. The enclosure 60 can also be positioned elsewhere in the vehicle 11.

Additionally, the enclosure 60 can be positioned in any location (i.e., map light enclosure, other electrical devices, etc.) that has wiring associated with it for other purposes. This can simplify manufacture of the vehicle wiring harness. Furthermore, if the enclosure 60 is located in an area where other DC power consuming devices are located in the vehicle, the need to run a separate DC power cable to the assembly location can be eliminated, further reducing complexity and cost of the vehicle wiring harness.

Thus, as described in detail, above, embodiments of the invention provide a mechanism for wiring a microphone (or alternatively an array of microphones) and an antenna, such as a Bluetooth® antenna within a vehicle in such a fashion as to reduce the cost of the design, installation and materials, for the microphone and antenna cables. While this invention has been particularly shown and described with references to preferred embodiments thereof, it will be understood by those skilled in the art that various changes in form and details may be made therein without departing from the spirit and scope of the invention, as defined by the appended claims.

What is claimed is:

1. A communication system for a vehicle, the communication system comprising:

a microphone array comprising a plurality of microphone elements mounted within the vehicle for receiving an acoustic signal and converting the acoustic signal to an electrical signal;

an antenna that is mounted proximate to the microphone array, the antenna communicating a radio frequency signal to a wireless device; and a controller located remotely from the microphone and antenna and having a first input that is electrically coupled to at least one microphone element in the microphone array and a second input that is electrically coupled to the antenna, the controller processing the electrical signal and transmitting the processed electrical signal to the antenna, a single cable that couples the controller to both the microphone array and the antenna;

a multiplexer that is coupled to the single cable, the multiplexer multiplexing at least two of a power signal, the electrical signal and the radio frequency signal for transmission over the single cable; and a de-multiplexer that is coupled to the single cable, the de-multiplexer de-multiplexing the at least two of the modulated power signal, the electrical signal and the radio frequency signal transmitted over the single cable.

2. The communication system of claim 1 further comprising a low-pass filter that is coupled to the microphone array.

3. The communication system of claim 1 further comprising a high-pass filter that is coupled to the antenna.

4. The communication system of claim 1 wherein the microphone array and the antenna are permanently mounted in the vehicle.

5. The communication system of claim 1 wherein the microphone array is positioned proximate to a headliner in the vehicle.

6. The communication system of claim 5 wherein a microphone element of the microphone array is positioned within one quarter of a wavelength away from a reflective plane formed by the headliner.

7. The communication system of claim 1 wherein the antenna communicates with the wireless device using a Bluetooth® communications protocol.

8. The communication system of claim 1 wherein the antenna is positioned proximate to a headliner in the vehicle at a distance from a grounded metal surface that is within one fifth of the wavelength of the radio frequency signal.

9. The communication system of claim 1 wherein the antenna is positioned overhead and forward of a driver in the vehicle.

10. The communication system of claim 1 wherein the antenna is positioned overhead, centered in the vehicle and forward of the driver.

11. The communication system of claim 1 wherein the antenna is mounted within a map light enclosure.

12. The communication system of claim 1 wherein the antenna is positioned in a location that is chosen from the group comprising a rear-view mirror, an instrument panel, a dashboard, a steering wheel, a visor, and an airbag cover.

13. The communication system of claim 1 wherein the microphone array and the antenna are mounted in an enclosure.

14. A communication system for a vehicle, the communication system comprising:
  a microphone array comprising a plurality of microphone elements mounted within the vehicle for receiving an acoustic signal and converting the acoustic signal to an electrical signal;
  an antenna that is mounted proximate to the microphone array, the antenna communicating a radio frequency signal to a wireless device; and
  a controller located remotely from the microphone and antenna and having a first input that is electrically coupled to at least one microphone element in the microphone array and a second input that is electrically coupled to the antenna, the controller processing the electrical signal and transmitting the processed electrical signal to the antenna,
  said communication system configured to provide balanced communications, wherein the first input that is electrically coupled to the at least one microphone in the microphone array further comprises:
  a first conductor that transmits a non-inverted polarity microphone output signal;
  a second conductor that transmits an inverted polarity microphone output signal;
  a third conductor that provides a reference point relative to the non-inverted and inverted polarity microphone output signals from the first and second conductors; and
  a differential amplifier for converting the non-inverted and inverted polarity microphone output signals from the first and second conductors to a single ended signal.

15. The enclosure of claim 14 wherein the housing comprises at least one port that allows the microphone array to receive the acoustic signal.

16. The enclosure of claim 14 wherein the housing comprises EMI shielding that reduces electro-magnetic interference in the enclosure.

17. The enclosure of claim 14 wherein the housing comprises acoustic damping material that reduces acoustic noise in the enclosure.

* * * * *